(12) United States Patent
Hoopes et al.

(10) Patent No.: US 8,095,474 B2
(45) Date of Patent: Jan. 10, 2012

(54) METHOD FOR PROCESSING ADVANCED SHIP NOTICES (ASNS)

(75) Inventors: John M. Hoopes, Washington, IL (US); Pauline C. Agbodjan-Prince, Peoria, IL (US); Douglas C. Meyer, Morton, IL (US); Mary J. Swearingen, Bartonville, IL (US)

(73) Assignee: Caterpillar Inc., Peoria, IL (US)

( * ) Notice: Subject to any disclaimer, the term of this patent is extended or adjusted under 35 U.S.C. 154(b) by 1200 days.

(21) Appl. No.: 11/605,334

(22) Filed: Nov. 29, 2006

(65) Prior Publication Data

US 2008/0126154 A1 May 29, 2008

(51) Int. Cl.
*G06Q 30/00* (2006.01)
(52) U.S. Cl. .................. 705/330; 705/333; 705/336
(58) Field of Classification Search .................. None
See application file for complete search history.

(56) References Cited

U.S. PATENT DOCUMENTS

| | | | |
|---|---|---|---|
| 6,006,199 A * | 12/1999 | Berlin et al. ............... 705/26 |
| 6,115,690 A | 9/2000 | Wong |
| 6,901,304 B2 | 5/2005 | Swan et al. |
| 6,928,411 B1 | 8/2005 | Fox et al. |
| 7,003,474 B2 | 2/2006 | Lidow |
| 2002/0046130 A1 | 4/2002 | Monteleone et al. |
| 2002/0069082 A1 | 6/2002 | Choe et al. |
| 2002/0116241 A1 | 8/2002 | Sandhu et al. |
| 2002/0143692 A1 | 10/2002 | Heimermann et al. |
| 2003/0233291 A1 | 12/2003 | Hsu et al. |
| 2004/0044951 A1 * | 3/2004 | Repko et al. ............... 715/500 |
| 2004/0149823 A1 | 8/2004 | Aptekar |
| 2004/0153379 A1 | 8/2004 | Joyce et al. |
| 2004/0215480 A1 | 10/2004 | Kadaba |
| 2005/0071320 A1 | 3/2005 | Chkodrov et al. |
| 2005/0071341 A1 | 3/2005 | Chkodrov et al. |
| 2005/0080644 A1 | 4/2005 | Greef et al. |
| 2005/0091129 A1 | 4/2005 | Tien |
| 2005/0149453 A1 | 7/2005 | Amling et al. |
| 2005/0197915 A1 | 9/2005 | Biwer et al. |
| 2005/0228681 A1 | 10/2005 | McMahon |
| 2005/0240524 A1 | 10/2005 | Van De Van et al. |
| 2005/0246415 A1 | 11/2005 | Belfiore et al. |
| 2005/0257098 A1 | 11/2005 | Andrews et al. |
| 2006/0074768 A1 | 4/2006 | Horton |
| 2006/0085241 A1 | 4/2006 | Chelniak et al. |
| 2006/0085294 A1 | 4/2006 | Boerner et al. |
| 2006/0089869 A1 | 4/2006 | Mundy |
| 2006/0095372 A1 | 5/2006 | Venkatasubramanian et al. |
| 2006/0136924 A1 | 6/2006 | Sadiq et al. |
| 2006/0143034 A1 | 6/2006 | Rothermel et al. |

* cited by examiner

*Primary Examiner* — Fahd Obeid
(74) *Attorney, Agent, or Firm* — Finnegan, Henderson, Farabow, Garrett & Dunner LLP (57) ABSTRACT

A method is disclosed for automatically processing Advanced Ship Notices (ASNs). In one embodiment, the method receives a first set of data associated with an ASN. The method further compares one or more data fields included in the first set of data with a second set of data associated with a Purchase Order (PO). In addition, the method determines a status associated with a shipment of items based on the comparison.

19 Claims, 5 Drawing Sheets

METHOD FOR PROCESSING ADVANCED SHIP NOTICES (ASNS)

TECHNICAL FIELD

The present disclosure relates generally to systems and methods for supply chain management, and more particularly, to a system and method for automatically processing advanced ship notices.

BACKGROUND

Businesses often use a coordinated system of organizations, people, activities, information, and resources to move items from point to point. This system is often referred to as the supply chain. Supply chain management (SCM) is the process of planning, implementing, and controlling the operations of the supply chain. The entities involved in the supply chain typically consist of purchasers and sellers, such as, for example, suppliers, manufacturers, goods and service providers, distributors, sales entities (e.g., wholesale, retail, etc.), end customers, and the like.

To manage the supply chain, businesses often use forms and documents (electronic and/or paper) to communicate and track activities in the supply chain. In many businesses, these documents may be sent and/or received electronically using Electronic Data Interchange (EDI). EDI is a commonly used method for the transfer of business transaction data, including the automated purchase of goods and services. For example, when a business desires to purchase goods and/or services, the business may use a purchase order (PO). The PO typically indicates the type, quantity, and price of items the business desires to purchase. The PO may also indicate the terms of payment, delivery date, and shipping. When a seller provides goods and/or services to the business, the seller may submit an invoice to the business. The invoice typically indicates the type, quantity, and price of items the seller has provided to the buyer. The invoice may also contain a reference to a corresponding PO, terms of payment, delivery date, and shipping information.

Another document that businesses frequently use in supply chain management is an Advanced Ship Notice (ASN). An ASN is a notification provided by the seller to the business indicating that a shipment of goods is currently, or soon-to-be, in-transit. The ASN is designed to inform a business of shipments before they arrive at the business location (e.g., distribution center, warehouse, etc.). The ASN contains pertinent information such as the bill of lading number, PO number, shipment information (e.g., weight, quantity, carrier, date of shipment, etc.), the goods contained in the shipment, and the like. By receiving an ASN from its suppliers, a business may realize improved efficiency in the supply chain through reduced receiving time and costs, improved supply chain visibility, improved planning for the receipt of merchandise in a distribution center, etc.

Systems and methods have been created to use a matching tool to perform matches between invoices. One such example is U.S. Pat. No. 6,928,411 (the '411 patent) issued on Aug. 9, 2005 to Fox et al. The '411 patent discloses an invoice processing tool for entering and storing invoices. In addition, the '411 patent discloses a database tool having goods received receipts and purchase orders. According to the '411 patent, a logical three-way match is performed and the stored invoice and logical results are transferred from the invoice processing tools to a database tool.

Although the system and method of the '411 patent may enable the determination of a three-way match, the system and method do not offer a way to evaluate advanced shipping notices against purchase orders before items are shipped and/or received. Thus, the system of the '411 patent does not provide mechanisms to automatically identify discrepancies between items purchased and items shipped at an earlier stage in the process.

The disclosed embodiments are directed to overcoming one or more of the problems set forth above.

SUMMARY OF THE INVENTION

In one aspect, the present disclosure is directed to a method for automatically processing Advanced Ship Notices. The method receives a first set of data associated with an ASN. The method further compares one or more data fields included in the first set of data with a second set of data associated with a Purchase Order (PO). In addition, the method determines a status associated with a shipment of items based on the comparison.

In another aspect, the present disclosure is directed to a computer-readable medium, including instructions for performing a method, when executed by a processor, for automatically processing Advanced Ship Notices. The method receives a first set of data associated with an ASN. The method further compares one or more data fields included in the first set of data with a second set of data associated with a Purchase Order (PO). In addition, the method determines a status associated with a shipment of items based on the comparison.

In another aspect, the present disclosure is directed to a system for automatically processing Advanced Ship Notices. The system includes at least one memory storing data and instructions and at least one processor configured to access the memory. The at least one processor is further configured to, when executing instructions, receive a first set of data associated with an ASN. The processor is further configured to compare one or more data fields included in the first set of data with a second set of data associated with a Purchase Order (PO). In addition, the processor is configured to determine a status associated with a shipment of items based on the comparison.

DETAILED DESCRIPTION

Figure 1:
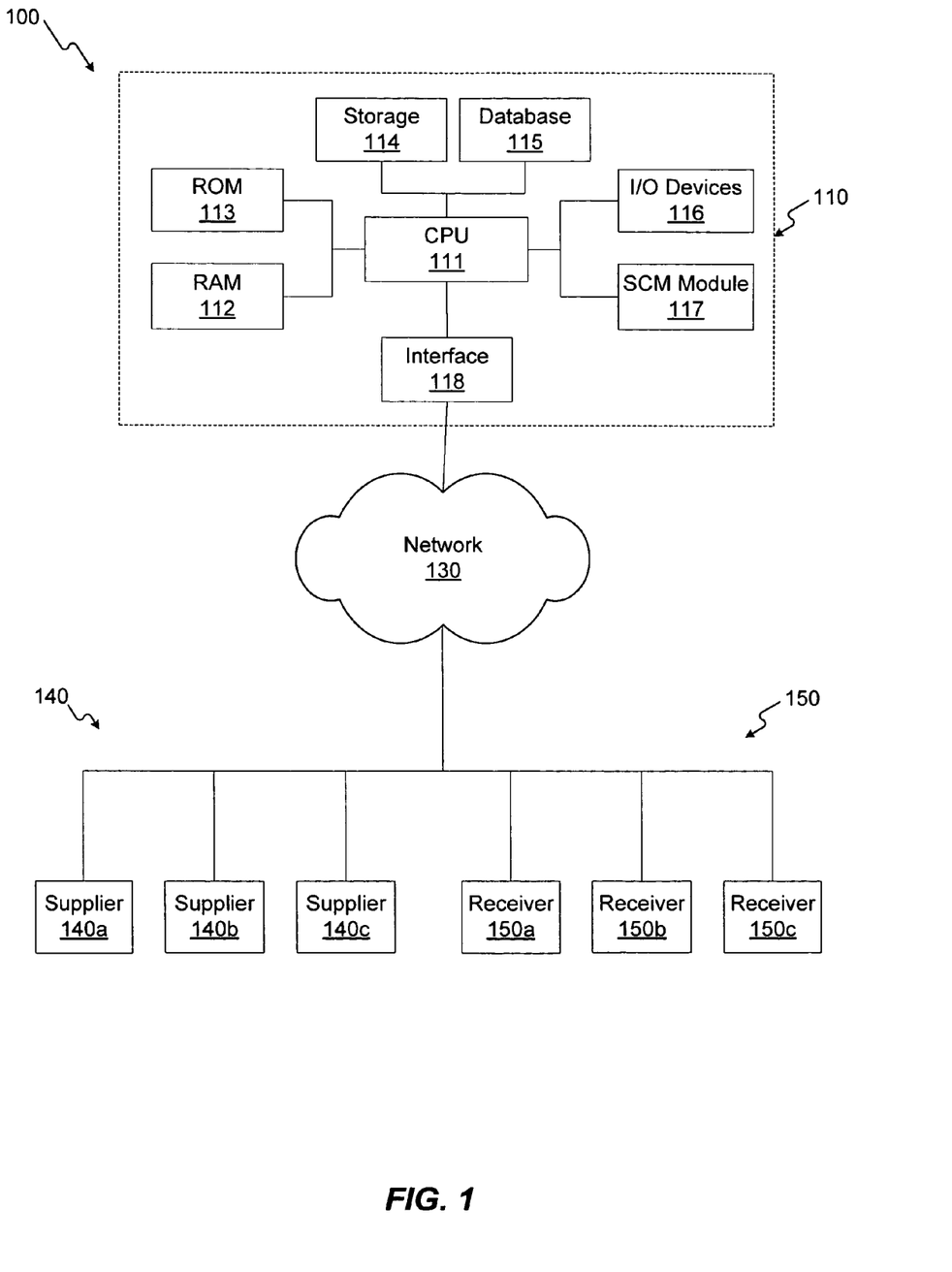
FIG. 1 is a block diagram of an exemplary system consistent with certain disclosed embodiments.

FIG. 1 illustrates an exemplary system architecture 100 for which systems and methods consistent with the disclosed embodiments may be implemented. As shown in FIG. 1, system architecture 100 may include one or more hardware and/or software components configured to display, collect, store, analyze, evaluate, distribute, report, process, record, and/or sort information associated with supply chain management and automated processing of ASNs. System architecture 100 may include supply chain management (SCM) computing system 110, network 130, and one or more suppliers 140.

SCM computing system 110 may be configured to receive, collect, analyze, evaluate, report, display, and distribute data related to supply chain management and ASNs using one or more hardware and/or software components. For example, SCM computing system 110 may include one or more of a central processing unit (CPU) 111, a random access memory (RAM) 1112, a read-only memory (ROM) 113, a storage 114, a database 115, one or more input/output (I/O) devices 116, supply chain management (SCM) modules 117, and interface 118. SCM computing system 110 may be a server, client, mainframe, desktop, laptop, network computer, workstation, personal digital assistant (PDA), tablet PC, scanner, telephony device, pager, and the like. In one embodiment, SCM computing system 110 may be a computer configured to receive and process information associated with the supply chain, including POs, invoices, ASNs, and the like. In addition, one or more constituent components of SCM computing system 110 may be co-located with any one or more suppliers, purchasers, warehouses, distribution centers, and the like.

CPU 111 may include one or more processors, each configured to execute instructions and process data to perform functions associated with SCM computing system 110. As illustrated in FIG. 1, CPU 111 may be communicatively coupled to RAM 112, ROM 113, storage 114, database 115, I/O devices 116, SCM modules 117, and interface 118. CPU 111 may be configured to execute computer program instructions to perform various processes and methods consistent with certain disclosed embodiments. In one exemplary embodiment, computer program instructions may be loaded into RAM 112 for execution by CPU 111.

RAM 112 and ROM 113 may each include one or more devices for storing information associated with an operation of SCM computing system 110 and/or CPU 111. For example, ROM 113 may include a memory device configured to access and store information associated with SCM computing system 110, including information for identifying, initializing, and monitoring the operation of one or more components and subsystems of SCM computing system 110. RAM 112 may include a memory device for storing data associated with one or more operations of CPU 111. For example, instructions stored on ROM 113 may be loaded into RAM 112 for execution by CPU 111.

Storage 114 may include any type of storage device configured to store any type of information used by CPU 111 to perform one or more processes consistent with the disclosed embodiments. Storage 114 may include one or more magnetic and/or optical disk devices, such as, for example, hard drives, CD-ROMs, DVD-ROMs, a universal serial bus (USB) port, a floppy, or any other type of mass media device.

Database 115 may include one or more software and/or hardware components that store, organize, sort, filter, and/or arrange data used by SCM computing system 110 and/or CPU 111. Database 115 may store one or more tables, lists, or other data structures containing data associated with supply chain management and automated processing of ASNs. For example, database 115 may store information associated with supply chain management, such as, for example, data associated with POs, invoices, ASNs, one or more suppliers, one or more shippers, one or more receivers, one or more warehouses, one or more distribution centers, freight and/or shipping data, as well as shipments received to, from, and/or between the aforementioned entities, etc., that may be used by CPU 111 to receive, categorize, prioritize, save, send, or otherwise manage data associated with the supply chain and automated processing of ASNs. In addition, database 115 may store additional and/or different information than that listed above.

I/O devices 116 may include one or more components configured to communicate information associated with SCM computing system 110. For example, I/O devices 116 may include a console with an integrated keyboard and mouse to allow a user to input parameters associated with SCM computing system 110 and/or data associated with the supply chain, supply chain management, supply chain discrepancies, and the automated processing of ASNs. I/O devices 116 may include one or more displays or other peripheral devices, such as, for example, printers, cameras, microphones, speaker systems, electronic tablets, bar code readers, scanners, or any other suitable type of I/O device 116.

SCM modules 117 may include one or more software programs, instructions, and/or listings configured to perform processes consistent with certain disclosed embodiments. For example SCM modules 117 may include a computer program product stored on computing system 110 and configured to be executed by CPU 111 to perform one or more processes for receiving and processing information associated with the supply chain and automated processing of ASNs.

Interface 118 may include one or more components configured to transmit and receive data via network 130, such as, for example, one or more modulators, demodulators, multiplexers, de-multiplexers, network communication devices, wireless devices, antennas, modems, and any other type of device configured to enable data communication via any suitable communication network. Interface 118 may also be configured to provide remote connectivity between CPU 111, RAM 112, ROM 113, storage 114, database 115, one or more input/output (I/O) devices 116, and/or SCM modules 117 to collect, analyze, and distribute data or information associated with the supply chain and supply chain management.

SCM computing system 110 may include additional, fewer, and/or different components than those listed above and it is understood that the listed components are exemplary only and not intended to be limiting. For example, one or more of the hardware components listed above may be implemented using software. In one exemplary embodiment, storage 114 may include a software partition associated with one or more other hardware components of SCM computing system 110. Additional hardware or software may also be used to operate SCM computing system 110, such as, for example, security applications, authentication systems, dedicated communication systems, etc. The hardware and/or software may be interconnected and accessed as required by authorized users. In addition, a portion, or all of, SCM computing system 110 may be hosted and/or operated offsite using, for example, commercial servers, commercial application providers, and the like.

Network 130 may be any appropriate network allowing communication between or among one or more computing systems, such as, for example, the Internet, a local area network, a wide area network, a WiFi network, a workstation peer-to-peer network, a direct link network, a wireless network, or any other suitable communication network. Connection with network 130 may be wired, wireless, or any combination thereof.

Suppliers 140a-c may be connected to SCM computing system 110 through network 130. Suppliers 140 may be any business or other entity that sells or provides goods to one or more other entities. In one exemplary embodiment, suppliers 140 may provide goods to one or more receivers 150a-c.

Receivers 150*a-c* may be any business or other entity who receives goods from one or more suppliers 140 including, for example, warehouses, distribution centers, wholesalers, retailers, resellers, merchants, repair shops, manufacturers, etc. In one embodiment, receivers 150 may be one or more warehouses and/or distribution centers associated with SCM computing system 110. In another embodiment, receivers 150*a-c* may each represent separately owned and/or operated business entities. Alternatively and/or additionally, SCM computing system 110 may be managed, owned, and/or operated by a business other than receivers 150 and may provide the disclosed embodiments as services to receivers 150.

Suppliers 140 and receivers 150 may each include one or more computing devices (i.e., desktop, laptop, mainframe, server, client, handheld computing device, personal digital assistant, telephony device, tablet PC, bar code reader, scanner, etc.) and various other hardware and/or software components (not shown). The one or more computing devices may allow suppliers 140 and receivers 150 to connect to and communicate with SCM computing system 110 by means of network 130.

In the disclosed embodiments, goods may include any type of goods, such as, for example, consumer goods, raw materials, production goods, whole products, parts, assemblies, sub-assemblies, components, sub-components, etc. Other, non-limiting examples of goods may include, for example, manufactured or manufacturing components, manufactured or manufacturing products, automobiles, water-craft (i.e., boats, ships, etc.), machines, machinery, automotive or machinery parts and supplies, engine parts and supplies, commercial products, office supplies, commercial goods including retail and/or wholesale goods, etc.

SCM modules 117 may use one or more electronic forms and/or documents to perform one or more processes consistent with certain disclosed embodiments. The electronic forms may provide data stored in database 115 of SCM computing system 110. In certain embodiments, the data may be edited, added, and/or removed by a user or software process. In addition, the electronic forms may provide mechanisms for storing data associated with supply chain management and automated processing of ASNs. In one embodiment, SCM modules 117 may access database 115 to retrieve and/or store data associated with the one or more electronic forms. The electronic forms may include, for example, a Receipt Match Discrepancy/Proof of Delivery (RMD/POD) form 200 (FIG. 2), Receiving Terminal System (RTS) forms 300 (FIGS. 3*a* and 3*b*), and the like. The forms discussed in FIGS. 2-3 and implemented by the disclosed embodiments are exemplary. The forms implemented by the disclosed embodiments may include fewer or more forms, different types of forms, and/or different fields or data.

Figure 2:
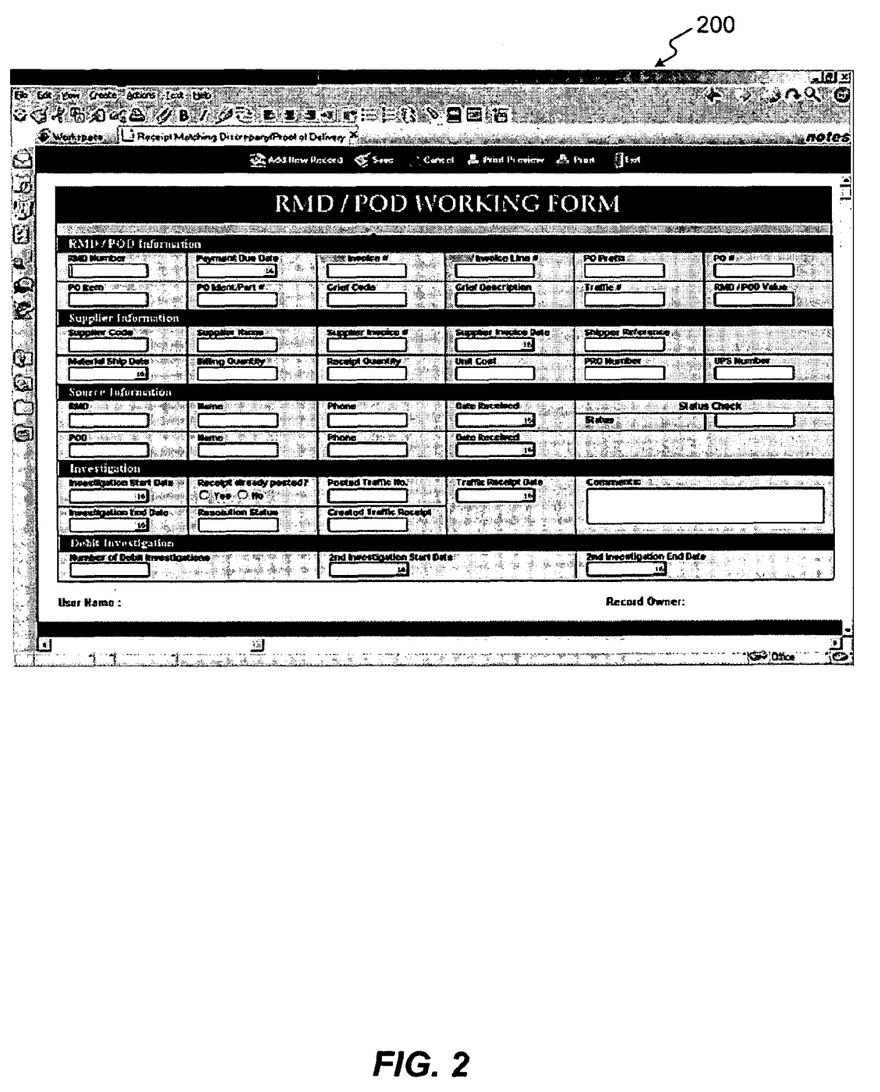
FIG. 2 is an screenshot of an exemplary Receipt Match Discrepancy/Proof of Delivery (RMD/POD) form consistent with certain disclosed embodiments.
Figure 3A:
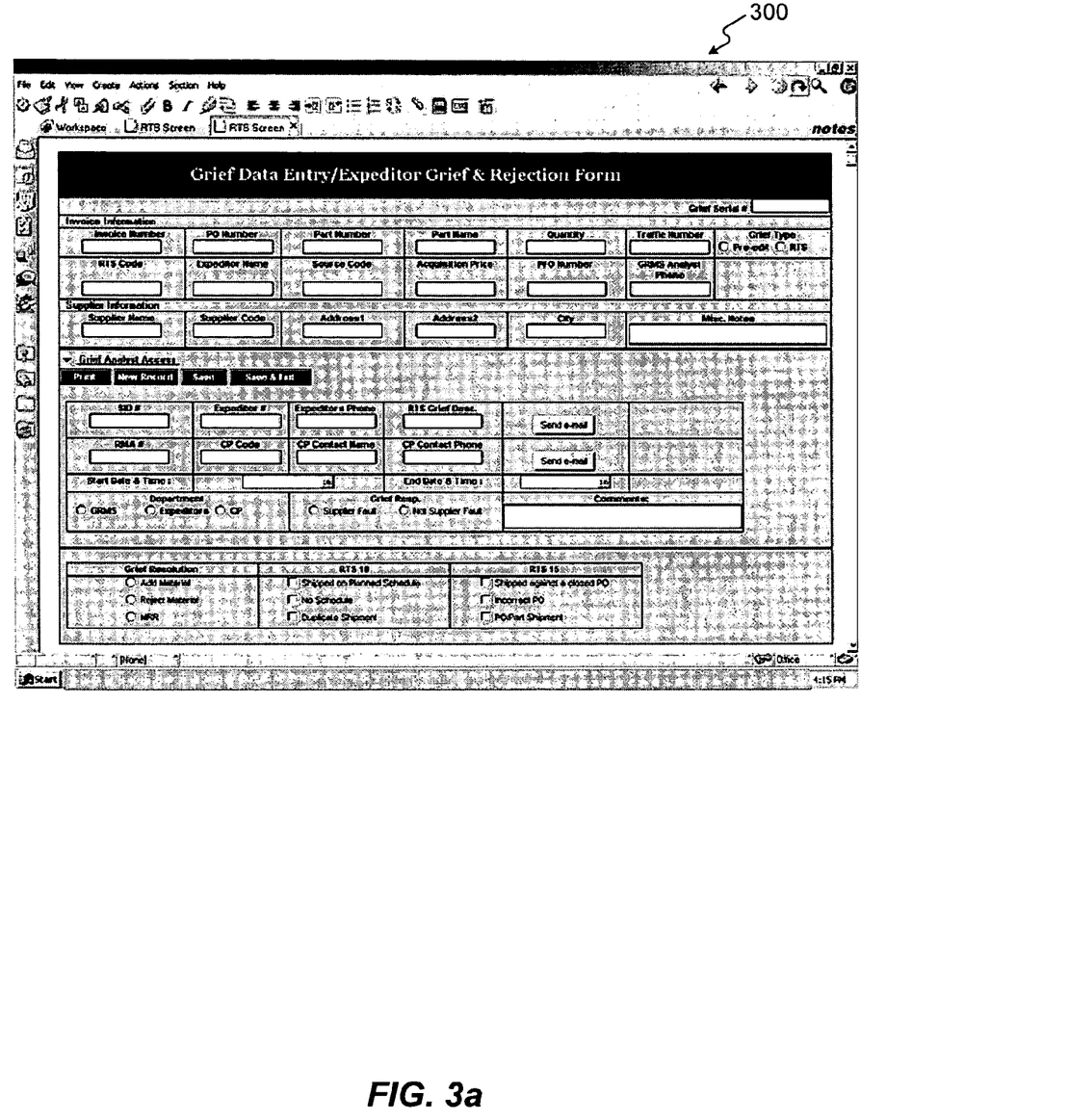
FIG. 3a is an screenshot of an exemplary Receiving Terminal System (RTS) form consistent with certain disclosed embodiments.
Figure 3B:
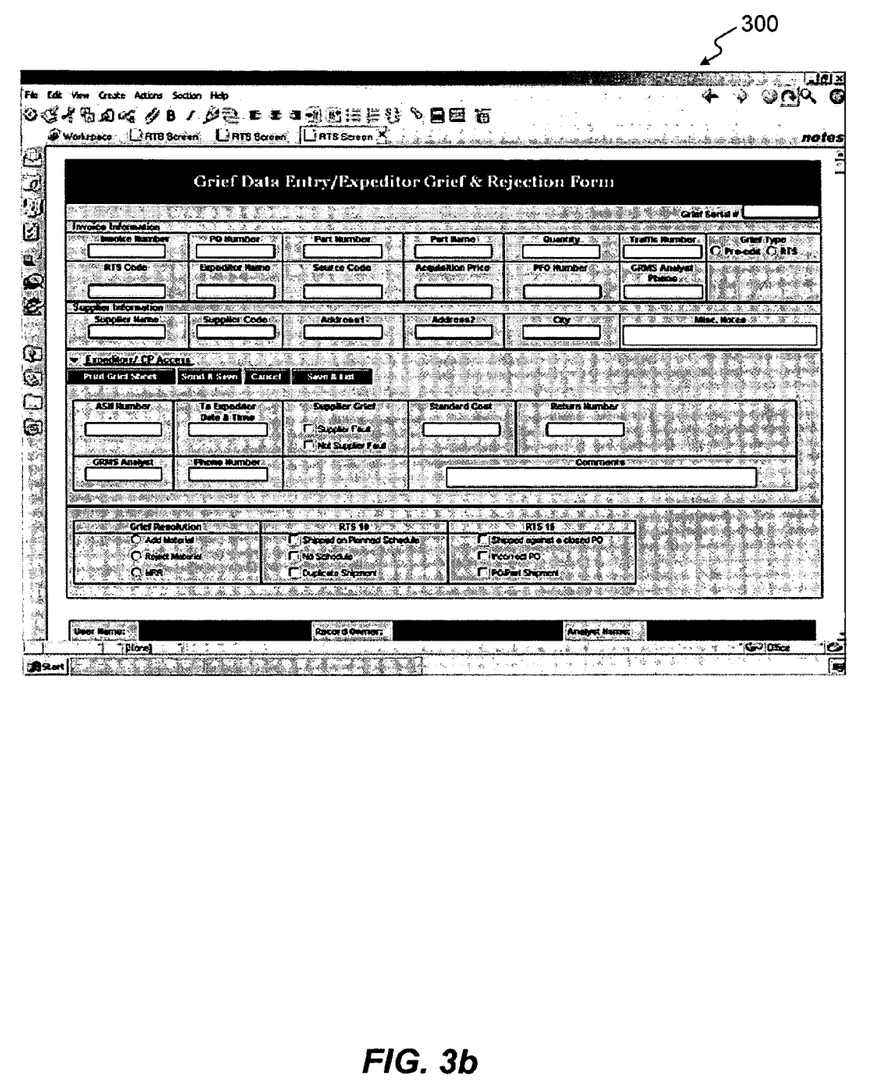
FIG. 3b is an screenshot of an exemplary Receiving Terminal System (RTS) form consistent with certain disclosed embodiments.

In one embodiment, RMD/POD form 200 and RTS form 300 may be accessed, edited, and stored by one or more authorized users. An authorized user may be any agent, employee, and other persons or entities authorized to view and/or edit data associated with supply chain management, including agents, employees, and other persons or entities associated with SCM computing system 110, suppliers 140, and receivers 150. For example, the one or more authorized users may include, for example, one or more persons or entities who may be responsible for maintaining supply management data and discrepancy records, one or more persons or entities who may be responsible for determining and providing data associated with item receipt, one or more persons or entities who may be responsible for independent tracking and verification of data and discrepancy record management, one or more persons or entities who may be responsible for providing data associated with the supply chain, one or more persons or entities who may be responsible for maintaining records for themselves and others, one or more persons or entities who may require access to data associated with supply chain management, and the like.

RMD/POD form 200 and/or RTS form 300 may be used to track and investigate discrepancies between ASNs and POs. In addition, RMD/POD form 200 and/or RTS form 300 may be configured to allow data associated with discrepancies between ASNs and POs to be added or deleted. In certain disclosed embodiments, SCM modules 117 may retrieve data from database 115 and insert the data in RMD/POD form 200 and/or RTS form 300 for display and/or editing by one or more authorized users. For example, one or more authorized users may update one or more data fields of RMD/POD form 200 and/or RTS form 300 and may save the edited data to database 115. Additionally, one or more authorized users may use RMD/POD form 200 to create a new discrepancy record by selecting "Add New Record" or print the currently displayed discrepancy data by selecting "Print."

In one embodiment, RTS form 300 may be configured to provide a different subset of the entire data set associated with the form depending on the identity of the entity attempting to access the data. For example, RTS form 300 may provide a basic set of data to a user. As shown in FIGS. 3*a* and 3*b*, the basic set of data may include, for example, invoice number, PO number, part number, quantity, RTS code, price, supplier name, supplier code, supplier address, and the like. In addition, SCM module 117 may provide a second set of data using RTS form 300 to a first set of users, such as, for example, information associated with an individual or group responsible for resolution (e.g., name and/or contact information, etc.), tracking numbers, resolution information, and the like, as shown in FIG. 3*a*. Additionally, as shown in FIG. 3*b*, SCM module 117 may provide a second subset of data using RTS form 300 to a second set of users, such as, for example, an associated ASN number, cost, return number, information associated with individuals and/or groups responsible for resolution (e.g., name and/or contact information, etc.), and the like. Although only two subsets of data are disclosed, SCM module 117 may provide fewer or additional subsets of data to other authorized users.

In addition to RMD/POD form 200 and RTS form 300, additional forms and/or compilations of the underlying records associated with the forms may be provided. For example, SCM modules 117 may provide a list of records associated with RMD/POD form 200 and/or RTS form 300 such that one or more authorized users may view a list of records associated with the form and may select one or more records for viewing and/or editing. The list of records may include only a portion of the data contained in the records, such as, for example, a record number, a PO number, an ASN number, and the like.

In some embodiments, SCM module 117 may be configured to automatically process one or more records to generate a list of records. The list of records may be processed based on a predetermined event (e.g., regularly scheduled time intervals, specified number of records having a certain priority, records for inventory items having a specified dollar amount, sales volume, and/or velocity [i.e., rate at which an item is sold], etc.). In one exemplary embodiment, SCM module 117 may process a list of records on a daily basis. In another embodiment, SCM module 117 may process a list of records at periodic hourly intervals when a record associated with a high value inventory item is included in the list of records. Alternatively and/or additionally, SCM module 117 may process a list of records when prompted, requested, instructed, or otherwise directed by an authorized user. In addition, the user may select one or more records from the list of records for viewing or editing. A selected record may be displayed using RMD/POR form 200 and/or RTS form 300. As shown in FIGS. 2-3, RMD/POR form 200 and RTS form 300 may display an expanded set of record data for a single record and the list of records may display a subset of record data for a plurality of records.

In addition, SCM module 117 may be configured to automatically manage the one or more records stored in database 115 as the records are processed. SCM module 117 may manage the records based on data values stored in the records or in RMD/POD form 200 and/or RTS form 300. For example, SCM module 117 may evaluate one or more fields in the record and, based on the data values stored in the fields, may automatically perform predetermined actions. For example, notifying one or more users of required and/or expected actions, sending electronic notifications to one or more users, sending electronic alerts and reminder to users, inputting data into one or more fields of the records, determining a required or desired next action towards resolution of one or more discrepancies, controlling access and/or visibility to individual records and/or forms and lists of records and forms, controlling access and/or visibility to RMD/POD form 200 and/or RTS form 300, controlling access and/or visibility to fields in the discrepancy record, controlling access and/or visibility to data fields of RMD/POD form 200, RTS form 300, and the like.

As discussed above, SCM module 117 may be configured to control access to RMD/POD form 200 and RTS form 300, as well as the list of records associated with those forms. In addition, SCM module 117 may control access to data fields, buttons, etc. within RMD/POD form 200 and RTS form 300. SCM module 117 may control access using a data field in the records and/or forms such as, for example, transaction types, PO numbers, ASN numbers, expeditor numbers, etc. For example, SCM module 117 may restrict access to records based on the identity of the user viewing the form, such that only an authorized user may view the forms and/or records.

Additionally, SCM module 117 may control activation of one or more buttons in RMD/POD form 200 and/or RTS form 300, and thereby allow editing or entry of data based upon the status of the record. For example, SCM module 117 may enable activation of buttons and/or editing of data when a record status is unresolved. SCM module 117 may disable activation of buttons to prevent editing or entry of data when a record status is resolved. For instance, when a record is created, SCM module 117 may automatically generate and send one or more notifications to one or more authorized users. SCM module 117 may automatically determine the recipients of the notification based on data contained in one or more data fields of the record, such as, for example, item number (e.g., part number), item value, item type, country of origin, quantity, days since report created, and the like. Notification may be electronically generated using, for example, electronic mail, instant message, electronic page, telephony contact, and similar types of electronic notification mechanisms.

SCM module 117 may automatically evaluate one or more data fields in the records to determine one or more further actions. For example, if the "start date" field is selected in an open discrepancy report, the current date and time may be automatically entered. In addition, responsibility for the discrepancy record may be assigned and the associated data may be automatically entered or updated, including, for example, name and phone number of a responsible party, and the like. The responsible party may be one or more individuals assigned to track resolution of the form and/or record.

Figure 4:
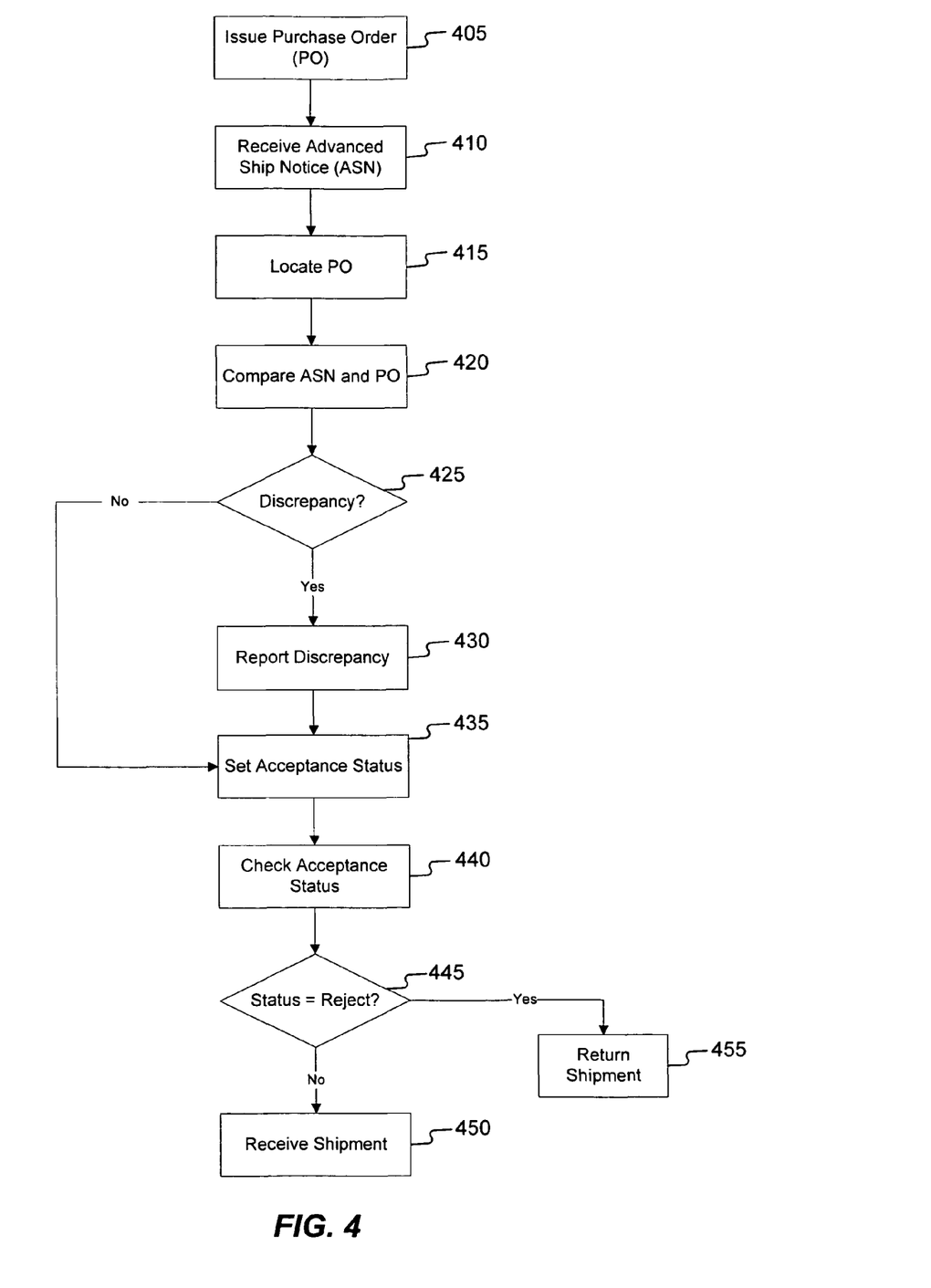
FIG. 4 is a flow chart illustrating an exemplary process for supply chain management consistent with certain disclosed embodiments.

FIG. 4 illustrates a flowchart of an exemplary process for supply chain management and automated processing of ASNs consistent with certain disclosed embodiments. The process of FIG. 4 may be performed by SCM computing system 110. For example, SCM computing system 110 may execute one or more software programs that may perform one or more of the process steps of FIG. 4.

Initially, SCM computing system 110 may prepare and issue a PO (step 405). The PO may be sent to a specified supplier 140, e.g., supplier 140a, using electronic means, such as, for example, email, electronic data interchange (EDI), ftp, telnet, fax, and the like. Alternatively and/or additionally, the PO may be sent to supplier 140 via paper-based means, such as, for example, mail, fax, courier, or the like. As discussed above, the PO may indicate the type, quantity, and price of items the receiver 150 desires to purchase from supplier 140, as well as the terms of payment, delivery date, and shipping. In addition, SCM computing system 110 may store the data corresponding to the PO in database 115.

Once supplier 140 is prepared to ship one or more items associated with the PO, supplier 140 may prepare and send an ASN. The ASN may be sent using electronic means, such as, for example, email, electronic data interchange (EDI), ftp, telnet, and the like, and may be received by SCM computing system 110 (step 410). Alternatively, the ASN may be sent via paper-based means, such as, for example, mail, fax, and the like. In some embodiments, if the ASN is sent via a paper-based means, data contained in the ASN may be converted into an electronic format. For example, data contained in a mailed ASN may be converted and stored as electronic data in SCM computing system 110 using, for example, manual data entry, optical character recognition, and the like. In either case, the ASN may be sent to SCM computing system 110 prior to, simultaneous with, or subsequent to shipment of the one or more items associated with the ASN. As discussed above, the ASN may contain information such as the bill of lading number, PO number, shipment information (e.g., weight, quantity, carrier, date of shipment, etc.), and a list of goods contained in the shipment. In some embodiments, if the shipment is correct and complete and the information contained in the ASN is accurate and complete, the data contained in the ASN may mirror the data contained in the PO.

When SCM computing system 110 receives an ASN, SCM computing system 110 may locate a PO associated with the received ASN in database 115 (step 415). For example, SCM computing system 110 may parse the data included in the ASN to determine the number of the associated PO. SCM computing system 110 may then access database 115 to locate the stored data associated with the PO number.

SCM computing system 110 may automatically compare the data included in the ASN and the data included in the PO with one another (step 420). In one embodiment, SCM computing system 110 may compare predetermined fields of data, such as, for example, item number, item quantity, and the like. As discussed above, if both the ASN data and the contents of the shipment are correct and complete, then certain predetermined data contained in the ASN and the PO may be identical. The certain predetermined data may include, for example, the type and quantity of items included in the shipment, item number, price, and the like.

If the compared data contained in the ASN is the same as the data contained in the PO, e.g., no discrepancy exists between the compared data (step 425, No), SCM computing system 110 may automatically set an acceptance status to "accept." The acceptance status may be an indication to receiver 150 as to how to process the incoming shipment corresponding to the ASN. Other acceptance statuses may include "reject" and "correct." In addition, the list of possible acceptance statuses is intended to be exemplary only and is not intended to be limiting. If the acceptance status is set to "accept," SCM computing system 110 may provide an indication to receiver 150 that the shipment associated with the ASN is to be accepted by receiver 150. The acceptance status may be indicated using any means of communicating information, such as, for example, verbal, aural, alphanumeric, graphical, pictorial, color, and the like.

If there is a discrepancy between the data included in the ASN and the data included in the PO (step 425, Yes), e.g., the compared data differs in type and/or quantity of items, item number, price, and the like, SCM computing system 110 may generate a discrepancy report (step 430). The discrepancy report may be a text or binary file consisting of data associated with the discrepancy and may be stored in database 115. In addition, the discrepancy report may be parsed by SCM computing system 110 to enable user-interaction such that a user may display, track, and/or edit the discrepancy report using one or more electronic forms (e.g., RMD/POD form 200, RTS form 300, etc.). The discrepancy report data may contain information, such as, for example, the supplier name, supplier contact information, shipping information, ASN number, PO number, quantity of items, item part numbers, and the like.

In addition, SCM module 117 may access database 115 to retrieve data and may store the retrieved data into the discrepancy record. The retrieved information may include, for example, item value, back order information, discrepancy record index value, condition values, comments, etc. In some embodiments, additional data may be retrieved and entered into the discrepancy record including, for example, shipment history, shipment quantities, misdirected shipment data, and the like.

Once a discrepancy report has been generated, an acceptance status may be set (step 435). As discussed above, the acceptance status may be, for example, accept, reject, correct, and the like. The acceptance status may be associated with the ASN and stored in SCM computing system 110.

In one embodiment, if there is a discrepancy between the PO and the ASN data, the acceptance status may be set to "accept." For example, if the discrepancy between the ASN and PO falls within an acceptable value or range of values (e.g., discrepancy less than a predetermined percentage of total shipment quantity and/or shipment value, discrepancy falls below a specified dollar value, etc.), supplier 140 provides multiple ASNs for one PO (e.g., backorders, delayed shipments, shipment from multiple locations, shipment to multiple locations, etc.), agreement between supplier 140 and receiver 150, logistical reasons (e.g., foreign supplier, overseas shipments, shipping costs, etc.), reasons associated with the items (e.g., high value items, high sales volume items, urgency or criticality of item, etc.), and the like. For example, if the PO indicates 100 units of item A, and supplier 140a is unable to ship the full quantity of item A in one shipment, SCM computing system 110 may determine a discrepancy between the ASN and PO but may set the acceptance status to "accept." As discussed above, if the acceptance status is set to "accept," SCM computing system 110 may provide an indication that the shipment is to be received by receiver 150.

SCM computing system 110 may, in some embodiments, set the acceptance status to "correct." Similarly to an acceptance status of "accept," the acceptance status may be set to "correct" if the discrepancy falls within an acceptable value or range of values (e.g., discrepancy less than a predetermined percentage of total shipment quantity and/or shipment value, discrepancy falls below a specified dollar value, etc.), supplier 140 provides multiple ASNs for one PO (e.g., backorders, delayed shipments, shipment from multiple locations, shipment to multiple locations, etc.), agreement between supplier 140 and receiver 150, logistical reasons (e.g., foreign supplier, overseas shipments, shipping costs, etc.), reasons associated with the items (e.g., high value items, high sales volume items, urgency or criticality of item, discontinued item, etc.), and the like. For example, if SCM computing system 110 detects a discrepancy between the PO and ASN data, but the items have a high sales volume, it may not be reasonable to reject the shipment. Thus, SCM computing system 110 may correct one or more data values associated with the shipment and/or item. In one embodiment, SCM computing system 110 may correct and reissue the PO. In another embodiment, SCM computing system 110 may correct the ASN. In either case, SCM computing system 110 may correct data value consistent with contract terms, industry standards, negotiation between supplier 140 and receiver 150, and the like. If the acceptance status is set to "correct," SCM computing system 110 may provide an indication that the ASN may be corrected prior to receipt of shipment.

In addition, SCM computing system 110 may set the acceptance status to "reject." The acceptance status may be set to reject if the discrepancy falls outside of an acceptable value or range of values (e.g., discrepancy greater than a predetermined percentage of total shipment quantity and/or shipment value, discrepancy is greater than a specified dollar value, etc.), agreement between supplier 140 and receiver 150, logistical reasons (e.g., local supplier, repeated discrepancies, change in supplier, etc.), reasons associated with the items (e.g., wrong item or items, defectives item or items, etc.), and the like. For example, if SCM computing system 110 detects a discrepancy between the part number included in the PO and the part number included in the ASN (e.g., the part ordered is not the part shipped), SCM computing system 110 may set the acceptance status to "reject." If the acceptance status is set to "reject," SCM computing system 110 may provide an indication that the shipment associated with the ASN is to be returned to supplier 140a.

When a shipment associated with the ASN is received by receiver 150, receiver 150 may check the acceptance status of the shipment (step 440). Receiver 150 may check the acceptance status by inputting a shipment identifier to SCM computing system 110. SCM computing system 110 may respond with an indication of the acceptance status for the shipment. The shipment identifier may be the ASN number, the PO number, a unique barcode value, and the like. As discussed above, the acceptance status may be indicated using any means of communicating information, such as, for example, verbal, aural, alphanumeric, graphical, pictorial, color, and the like.

If SCM computing system 110 indicates that the acceptance status is set to "reject" (step 445, Yes), receiver 150 may return the shipment to supplier 140 (step 455). The shipment may be returned using any standard method, procedure, and/or means known in the art. In addition, the cost of returning the shipment may be assumed by supplier 140.

If SCM computing system 110 indicates the acceptance status is set to "accept" or "correct" (step 445, No), receiver 150 may receive and process the shipment (step 450). Receipt and processing of the shipment associated with the ASN may be done using any standard method, procedure, and/or means known in the art.

As an example according to certain disclosed embodiments, SCM computing system 110 may issue a PO, e.g., PO number 1234, to supplier 140a requesting the purchase of a quantity of 10 of item X at a purchase price of $100 each. Supplier 140a may receive the PO and prepare a shipment containing 10 units of item X. On the day supplier 140a is to ship the shipment to receiver 150a, supplier 140a may send an ASN to SCM computing system 110. The ASN may indicate shipment of 10 units of item X at a purchase price of $100. SCM computing system 110 may parse the ASN to locate PO number 1234, and then may access database 115 to locate the data associated with PO number 1234. SCM computing system 110 may then compare the ASN with the PO to determine if certain data fields in the two sets of data are equal. Since both the ASN and PO indicate a quantity of 10 of item X, SCM computing system 110 may indicate an acceptance status of "accept." Thus, when the shipment is received by receiver 150a, receiver 150a may input the reference number to SCM computing system 110 to check the acceptance status, and receive an acceptance status of "accept."

As discussed above, when the acceptance status is set to "accept," receiver 150a may receive and process the incoming shipment.

As another example according to certain disclosed embodiments, SCM computing system 110 may issue a PO, e.g., PO number 2345, to supplier 140a requesting the purchase of a quantity of 20 of item Y at a purchase price of $200 each. Supplier 140a may receive the PO and prepare a shipment containing a 15 units of item Y. In addition, supplier 140a may prepare a second shipment containing 5 units of item Y. On the day supplier 140a is to ship the shipment to receiver 150a, supplier 140a may send two ASNs to SCM computing system 110. The first ASN may indicate shipment of 15 units of item Y at a purchase price of $200 and the second ASN may indicate shipment 5 units of item Y at a purchase price of $200. SCM computing system 110 may parse the ASNs to locate PO number 2345, and then may access database 115 to locate the data associated with PO number 1234. SCM computing system 110 may then compare each of the ASNs with the PO to determine if certain data fields in the two sets of data are equal. Although the data contained in the individual ASNs do not equal the data contained in the single PO, SCM computing system 110 may determine that each of the shipments are to be received. Thus, SCM computing system may indicate an acceptance status of "accept" for each of the ASNs. Accordingly, receiver 150a may input a shipment reference number to SCM computing system 110 and, upon return of an acceptance status of "accept," receiver 150a may receive and process the incoming shipment.

As another example according to certain disclosed embodiments, SCM computing system 110 may issue a PO, e.g., PO number 3456, to supplier 140a requesting the purchase of a quantity of 50 of item Z at a purchase price of $50 each. Supplier 140a may receive the PO and prepare a shipment containing 30 units of item M. On the day supplier 140a is to ship the shipment to receiver 150a, supplier 140a may send an ASN to SCM computing system 110. The ASN may indicate shipment of 30 units of item M at a purchase price of $100. SCM computing system 110 may parse the ASN to locate PO number 3456, and then may access database 115 to locate the data associated with PO number 3456. SCM computing system 110 may then compare the ASN with the PO to determine if certain data fields in the two sets of data are equal. Because the data contained in the PO and ASN differ in quantity, item, and price, SCM computing system 110 may indicate an acceptance status of "reject." Thus, upon receipt of the shipment by receiver 150a, receiver 150a access SCM computing system 110 with a shipment reference number and may find an acceptance status of "reject." As discussed above, when the acceptance status is set to "reject," receiver 150a may return the shipment to supplier 140a at the expense of supplier 140a.

INDUSTRIAL APPLICABILITY

The disclosed embodiments may be implemented with processes involving supply chain management. The disclosed embodiments may achieve improved processing for sending and receiving goods between a business and its suppliers. In particular, the disclosed embodiments may provide improved data input, tracking, and auditing of supply chain documents, including invoices, POs, and ASNs, as well as supply chain discrepancies.

In addition, the disclosed embodiments may be used within a business entity. The business entity may include divisions, groups, etc. that interact as sub-entities for the business entity. The sub-entities may act as a purchaser of a good supplied by a supplier sub-entity within the same business entity, such as a manufacturing business with supply division, production line division, shipping division, etc.

It will be apparent to those skilled in the art that various modifications and variations can be made in the system and method of supply chain management and automated processing of ASNs. It is intended that the specification and examples be considered as exemplary only, with a true scope of the disclosed embodiments being indicated by the following claims and their equivalents.

What is claimed is:

1. A method for automatically processing Advanced Ship Notices (ASNs), comprising:
   receiving a first set of data associated with an ASN in a Supply Chain Management (SCM) computing system;
   comparing, within the SCM computing system, one or more data fields included in the first set of data with a second set of data associated with a Purchase Order (PO);
   executing a discrepancy determination in the SCM computing system by determining if there is a discrepancy between one or more predetermined fields included in the first set of data and one or more predetermined fields in the second set of data; and
   if the SCM computing system determines that there is a discrepancy, generating a discrepancy report and generating in the SCM computing system an acceptance status associated with a shipment of items by:
   comparing the discrepancy to acceptable ranges of values stored in the SCM computer system, the acceptable ranges of values including a first range of values associated with a first data field from the first and second sets of data, and a second range of values associated with a second data field from the first and second sets of data, wherein the first range of values is different from the second range of values;
   setting the acceptance status to "accept" if the discrepancy is associated with the first data field and falls within the first range of values;
   setting the acceptance status to "correct" if the discrepancy is associated with the second data field and falls within the second range of values, and automatically correcting one or more predetermined fields in at least one of the first and second sets of data; and
   setting the acceptance status to "reject" if the discrepancy falls outside of the first and second ranges of values.

2. The method of claim 1, wherein the comparing one or more data fields included in the first set of data with the second set of data further includes:

comparing one or more data fields included in the first set of data with one or more data fields included in the second set of data.

3. The method of claim 1, wherein the first set of data includes at least one of a PO number, an item number, an item quantity, or an item price.

4. The method of claim 3, wherein the second set of data includes at least one of a PO number, an item number, an item quantity, or an item price.

5. The method of claim 3, further including:
determining, from the first set of data, the PO number; and
based on the PO number, retrieving data associated with a stored PO.

6. The method of claim 4, wherein comparing one or more data fields of the first set of data with the second set of data further includes:
comparing at least one of the PO number, the item number, the item quantity, or the item price included in the first set of data with at least one of the PO number, the item number, the item quantity, or the item price included in the second set of data.

7. A non-transitory computer readable medium including instructions for performing a method, when executed by a processor, for automatically processing Advanced Ship Notices (ASNs), the method comprising:
receiving a first set of data associated with an ASN;
comparing one or more data fields included in the first set of data with a second set of data associated with a Purchase Order (PO);
determining if there is a discrepancy between one or more predetermined fields included in the first set of data and one or more predetermined fields in the second set of data; and
if it is determined that there is a discrepancy, generated a discrepancy report and determining an acceptance status associated with a shipment of items by:
comparing the discrepancy to acceptable ranges of values, the acceptable ranges of values including a first range of values associated with a first data field from the first and second sets of data, and a second range of values associated with a second data field from the first and second sets of data, wherein the first range of values is different from the second range of values;
setting the acceptance status to "accept" if the discrepancy is associated with the first data field and falls within the first range of values;
setting the acceptance status to "correct" if the discrepancy is associated with the second data field and falls within the second range of values, and automatically correcting one or more predetermined fields in at least one of the first and second sets of data and
setting the acceptance status to "reject" if the discrepancy falls outside of the first and second ranges of values.

8. The non-transitory computer readable medium of claim 7, wherein the comparing one or more data fields included in the first set of data with the second set of data further includes:
comparing one or more data fields included in the first set of data with one or more data fields included in the second set of data.

9. The non-transitory computer readable medium of claim 7, wherein the first set of data includes at least one of a PO number, an item number, an item quantity, or an item price.

10. The non-transitory computer readable medium of claim 9, wherein the second set of data includes at least one of a PO number, an item number, an item quantity, or an item price.

11. The non-transitory computer readable medium of claim 9, further including:
determining, from the first set of data, the PO number; and
based on the determined PO number, retrieving data associated with a stored PO.

12. The non-transitory computer readable medium of claim 10, wherein the comparing one or more fields of the first set of data with the second set of data further includes:
comparing at least one of the PO number, the item number, the item quantity, or the item price included in the first set of data with at least one of the PO number, the item number, the item quantity, or the item price included in the second set of data.

13. A system for automatically processing Advanced Ship Notices (ASNs), comprising:
at least one memory storing data and instructions; and
at least one processor configured to access the memory and configured to, when executing the instructions:
receive a first set of data associated with an ASN;
compare one or more data fields included in the first set of data with a second set of data associated with a Purchase Order (PO);
determine if there is a discrepancy between one or more predetermined fields included in the first set of data and one or more predetermined fields in the second set of data;
if it is determined that there is a discrepancy, generating a discrepancy report and determine an acceptance status associated with a shipment of items by:
comparing the discrepancy to acceptable ranges of values, the acceptable ranges of values including a first range of values associated with a first data field from the first and second sets of data, and a second range of values associated with a second data field from the first and second sets of data, wherein the first range of values is different from the second range of values;
setting the acceptance status to "accept" if the discrepancy is associated with the first data field and falls within the first range of values;
setting the acceptance status to "correct" if the discrepancy is associated with the second data field and falls within the second range of values, and automatically correcting one or more predetermined fields in at least one of the first and second sets of data and
setting the acceptance status to "reject" if the discrepancy falls outside of the first and second ranges of values.

14. The method of claim 1, in which automatically correcting one or more predetermined fields in at least one of the first and second sets of data comprises correcting one or more predetermined fields in the second set of data associated with the PO and automatically reissuing a corrected PO.

15. The method of claim 1, in which automatically correcting one or more predetermined fields in at least one of the first and second sets of data comprises correcting one or more predetermined fields in the first set of data associated with the ASN.

16. The non-transitory computer readable medium of claim 7, in which automatically correcting one or more predetermined fields in at least one of the first and second sets of data comprises correcting one or more predetermined fields in the second set of data associated with the PO and automatically reissuing a corrected PO.

17. The non-transitory computer readable medium of claim 7, in which automatically correcting one or more predetermined fields in at least one of the first and second sets of data comprises correcting one or more predetermined fields in the first set of data associated with the ASN.

18. The system of claim 13, in which automatically correcting one or more predetermined fields in at least one of the first and second sets of data comprises correcting one or more predetermined fields in the second set of data associated with the PO and automatically reissuing a corrected PO.

19. The system of claim 13, in which automatically correcting one or more predetermined fields in at least one of the first and second sets of data comprises correcting one or more predetermined fields in the first set of data associated with the ASN.

* * * * *